United States Patent Office 3,173,905
Patented Mar. 16, 1965

3,173,905
DYESTUFFS OF THE INDAZOLE SERIES
Robert Frédéric Michel Sureau, Enghien-les-Bains, Gilbert Victor Henri Krémer, Ermont, and Victor Marie Dupré, Louvres, France, assignors, by mesne assignments, to Etablissements Kuhlmann, Paris, France, a corporation of France
No Drawing. Filed Oct. 17, 1961, Ser. No. 145,741
Claims priority, application France, Oct. 21, 1960, 841,805
4 Claims. (Cl. 260—162)

The present invention concerns new dyestuffs of the indazole series.

In our co-pending application Serial No. 140,260, entitled "New Indazolium Salts," there are described, amongst other new products, the hydrazones of the general formula:

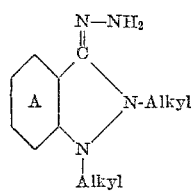

(I)

in which the benzene ring A may be substituted if desired by halogen atoms or non-solubilising groups such as alkyl, alkoxy, nitro, cyano, alkylsulphonyl or sulphonamido groups, and the "alkyl" groups in positions 1 and 2 may be the same or different.

We have now found that, starting from hydrazones of Formula I, valuable new dyestuffs can be obtained which may be considered as belonging to the series of tetra-azapentamethinecyanines. These new dyestuffs have the following general formula:

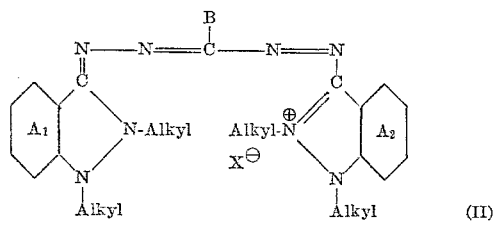

(II)

in which the "Alkyl" groups may be the same or different, B represents a hydrogen atom or an alkyl or phenyl group which may possibly be substituted by non-solubilising groups, the nuclei $A_1$ and $A_2$ may be substituted in the same positions or in different positions by the same or different halogen atoms or non-solubilising groups, and X represents a monovalent anion or its equivalent.

The most general method of preparation of the dyestuffs of the Formula II comprises condensing in a first phase in aqueous or aqueous-alcoholic solution, for example, a salt of a hydrazone of Formula I with an aldehyde of formula O=CHB (III) in which B has the same significance as above. This condensation is usually carried out at room temperature in the presence of a mild alkaline agent such as sodium acetate. Under these conditions a ketaldazine of the formula

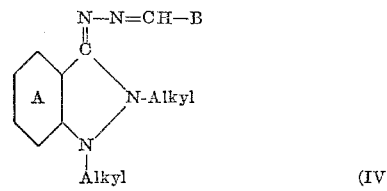

(IV)

is obtained, which may be isolated, for example, by salting out as the hydrochloride or in the free state by the addition of ammonia. In a second phase a ketaldazine of Formula IV is reacted with a hydrazone of Formula I, which may be the hydrazone used to obtain this ketaldazine of a different hydrazone. The reaction is carried out with an approximately equimolecular amount of hydrazone in aqueous solution and in the presence of a small amount of organic acid so that the pH is between 4 and 6.5 and an oxidizing agent. A strong coloration develops more or less rapidly at the room temperature, then the dyestuff of Formula II begins to crystallise.

When the ketaldazine used is not sufficiently soluble in aqueous acid medium, the reaction can be effected in an organic solvent which is miscible with water, such as a low molecular weight alcohol or dioxan. The use of an alcohol of formula R—CH$_2$OH (V) as solvent may however give a mixture of dyestuffs on account of the partial oxidation of the alcohol into aldehyde; a mixture of dyestuffs is formed when R is different from B.

A variation of the above process according to the invention turns to account the oxidation of an alcohol of formula B—CH$_2$—OH in the reaction medium in order to prepare dyestuffs of Formula II in which the nuclei $A_1$ and $A_2$ carry identical substituents in the same positions. It comprises reacting, preferably at room temperature, an oxidising agent with an aqueous-alcoholic solution, of a hydrazine of Formula I or one of its salts, in the presence of a small amount of organic acid or that the pH is between 4 and 6.5 and possibly of a neutralising agent such as an alkali metal salt of an organic acid or a tertiary base such as pyridine or diethylaniline. The aliphatic alcohols and the monoalkyl ethers of ethylene glycol may be employed for example as the alcoholic solvent. The dyestuffs are separated from the reaction medium in crystalline form. This variation of the process according to the invention is surprising. It was not foreseeable, in fact, that the reactions which occur could follow one another in the following order: partial oxidation of the alcohol (V) into the corresponding aldehyde (III), condensation of this aldehyde with the hydrazone (I) to give ketaldazine (IV) and finally, oxidising condensation of the ketaldazine (IV) thus formed with the hydrazone (I), and simultaneous development.

A variety of oxidising agents can be used for both of these two processes such as, for example, hydrogen peroxide, organic peracids such as peracetic acid, persalts such as perborates, persulphates, permanganates, chromates or dichromates, hypochlorites or hypobromites, chlorites, ferricyanides, or peroxides such as manganese or lead dioxides. It may also be advantageous in certain cases to catalyse the reaction by the addition of small quantities of certain reducing salts such as for example ferrous sulphate.

The dyestuffs formed precipitate in the crystalline state and their separation may be completed for example by dilution of the medium with brine and/or by the addition of a solution of zinc chloride.

The aqueous solutions of the dyestuffs of Formula II are perfectly stable in a large number of cases, even on prolonged boiling. This property, which enables them to be used for dyeing, is quite unexpected. It is in fact known that known dyestuffs of an analogous type such as those which are derived from 3-alkyl-2-benzothiazolehydrazone are very unstable in aqueous solution. (See S. Hünig and K. H. Fritsch, Liebig's Annalen, volume 609, 1957, page 174.)

The dyestuffs of general Formula II are found to be particularly interesting for the coloration of fibres based on polymers or copolymers of acrylonitrile. They provide a series of blues and greens of great brilliancy, which have excellent fastness, especially to light. In addition, they generally have the property of being progressively adsorbed on the fibre as the temperature of the dyebath is raised, which ensures good uniformity of shade.

In the following examples which are purely illustrative and to which the invention is not limited, the parts are by weight unless the contrary is indicated.

*Example 1*

13 parts of 1,2-dimethyl-6-nitro-indabolone hydrazone hydrochloride are dissolved in 200 parts of tepid water and 28 parts by volume of a 25% solution of sodium acetate. The solution is cooled to 15°C. and 5 parts of acetaldehyde are added, when the solution turns brown. It is agitated for a quarter of an hour, and then 100 parts by volume of 25% sodium acetate solution are added over a period of half an hour. A brown precipitate is formed, the separation of which is completed by the addition of 4 parts by volume of concentrated ammonia. The precipitate is filtered off, washed with ice water and dried under vacuum. There are thus obtained in the form of a brown precipitate 10.7 parts of the ketaldazine of the following formula:

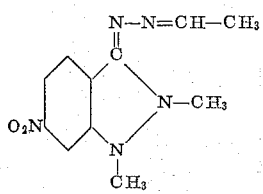

When recrystallised boiling water, it is obtained in the form of fine brown needles melting at 132–133°C., sparingly soluble in water but very soluble in dilute mineral acids or dilute organic acids and soluble in organic solvents.

*Analysis.*—Calculated for $C_{11}H_{13}N_5O_2$, percent: C, 53.45; H, 5.27; N, 28.32. Found, percent: C, 54.1; H, 5.8; N, 28.5.

12.5 parts of the above ketaldazine and 13 parts of 1,2-dimethyl-6-nitro-3-indazolone hydrazone hydrochloride are dissolved in 500 parts of lukewarm water and 10 parts of acetic acid. The solution is cooled to 20–25°C. and solution of 6 parts of sodium chlorite in 60 parts of water is introduced over a period of 20 minutes. A blue coloration rapidly appears, then a crystalline precipitate of the dyestuff. At the end of 24 hours 25 parts of sodium chloride are added, and after an hour's stirring, the product is filtered off, washed with 5% brine, drained and dried at a temperature below 50° C. 16 parts of a dyestuff are obtained in the form of fine bronze crystals soluble in boiling water giving a green-blue solution and in cold water giving a violet blue solution. This dyestuff, after recrystallisation from boiling acetic acid, melts on the Maquenne block at 285–288° C. (decomposition). The analysis enables the following constitution to be attributed to it:

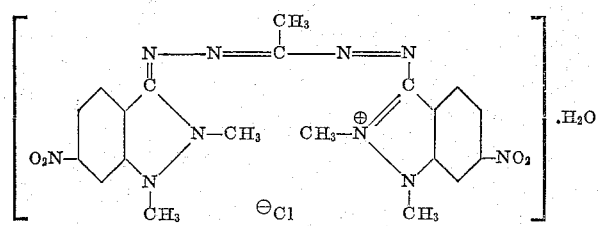

Calculated for $S_{20}H_{21}O_4N_{10}Cl.H_2O$, percent: C, 46.3; H, 4.45; N, 27.0; Cl, 6.84. Found, percent: C, 45.7; H, 4.86; N, 26.7; Cl, 6.5.

In an acetic acid bath having a pH between 3 and 6 it dyes fibres based on polymers or copolymers of acrylonitrile a royal blue shade, bright and full-bodied and very even and of excellent fastness, especially to light.

*Example 2*

26 parts of 1,2-dimethyl-6-nitro-3-indazolone hydrazone hydrochloride are dissolved in 200 parts of tepid water and 1000 parts of ethanol. 20 parts of acetic acid, 16 parts of diethylaniline and a solution of 0.5 part of ferrous ammonium sulphate in 10 parts of water are added. Into this stirred solution is introduced a solution of 10 parts of sodium chlorite in 100 parts of water, at a temperature of 20° C. to 25° C. and over a period of 20 minutes. It is found that, before the end of the introduction of the oxidising agent, a deep blue coloration appears and the dyestuff begins to crystallise. At the end of two and a half hours agitation, the dyestuff is filtered off, washed with a little alcohol and dried at moderate temperature. 15 parts dyestuff identical with that described in Example 1 are thus obtained. After standing for two days, a further 1.3 parts of the same dyestuff are separated by filtration.

On replacing the diethylaniline in this example by a solution of 56 parts by volume of 25% sodium acetate or by 20 parts of pyridine, and under the same conditions, an identical dyestuff is obtained.

*Example 3*

On replacing the 1,2-dimethyl-6-nitro-3-indazolone hydrazone hydrochloride in Examples 1 and 2 by the isomeric 5-nitro compound, and under similar conditions, an isomeric dyestuff is obtained which dyes fibres based on polymers or copolymers of acrylonitrile a bright green shade which is very even and has excellent general fastness, especially to light.

*Example 4*

On condensing as in Example 1 12.5 parts of the ketaldazine described in that example with 13 parts of 1,2-dimethyl-5-nitro-3-indazolone hydrazone hydrochloride, there is obtained under the same conditions a dyestuff which dyes acrylic fibres a green blue shade intermediate between those obtained according to Examples 1 and 3 and having similar properties.

*Example 5*

On replacing the sodium chlorite solution in Example 2 by a solution of 46 parts of ammonium persulphate in 200 parts of water, and carrying out the reaction at between 0° C. and 5° C. for a period of 4 hours (addition of ferrous ammonium sulphate is useless), 21 parts of a dyestuff are obtained which has similar tinctorial properties but is less soluble.

*Example 6*

On replacing the ammonium persulphate in Example 5 by potassium ferricyanide (65 parts in 200 parts of water) or potassium dichromate (20 parts in 100 parts of water), blue dyestuffs which are very sparingly soluble even in boiling water are obtained with good yields.

*Example 7*

On replacing the acetaldehyde in Example 1 by benzaldehyde (6 parts), the corresponding ketaldazine melting at 170–171° C. is obtained. On finishing the preparation with the latter compound as in Example 1, a dyestuff is obtained which dyes fibres based on polymers or copolymers of acrylonitrile a greenish blue shade endowed with equivalent properties.

*Example 8*

On replacing the acetaldehyde in Example 1 by isobutyraldehyde (5 parts), the corresponding ketaldazine is obtained which melts at 96–97° C. The latter under the conditions of Example 1 gives a blue dyestuff which is a little more greenish but has the same tinctorial properties.

*Example 9*

On replacing the 1,2-dimethyl-6-nitro-3-indazoline hydrazone hydrochloride in Example 2 by one of the following hydrochlorides:

1,2-diethyl-6-nitro-3-indazolone hydrazone hydrochloride 1-methyl-2-ethyl-6-nitro-3-indazolone hydrozone hydrochloride 2-methyl-1-ethyl-6-nitro-3-indazolone hydrazone hydrochloride blue dyestuffs having very similar tinctorial properties are obtained.

In the table below are grouped a certain number of other examples of dyestuffs of Formula II in which the "alkyls" represent methyl groups.

| Example | Substituent of A₁ | B | Substituent of A₂ | Shade on fibre of polymers or copolymers of acrylonitrile |
|---|---|---|---|---|
| 10 | 6-nitro | Methyl | unsubstituted | Blue. |
| 11 | 4-nitro | do | 4-nitro | Do. |
| 12 | 7-nitro | do | 7-nitro | Green-blue. |
| 13 | 6-chloro | do | 6-chloro | Blue. |
| 14 | 5-chloro | do | 5-chloro | Do. |
| 15 | do | H | 5-nitro | Bluish green. |
| 16 | 6-nitro | 4-N-dimethyl-aminophenyl | 6-nitro | Green-blue. |
| 17 | do | H | do | Blue. |
| 18 | 6-cyano | CH₃ | 6-cyano | Vivid blue. |

We claim:
1. Dyestuffs of the general formula:

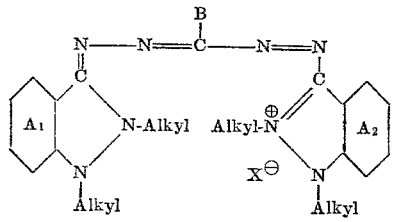

in which the benzene nuclei A₁ and A₂ are each substituted by members selected from the group consisting of hydrogen, chlorine and the nitro group, B represents a member selected from the group consisting of hydrogen, alkyl groups having 1 to 3 inclusive carbon atoms, phenyl and p-amino phenyl groups, X represents an anion, and the Alkyl substituent present in the $N_1$ and $N_2$ positions being a member selected from the group consisting of the methyl and ethyl groups.

2. The quaternary compound of the formula:

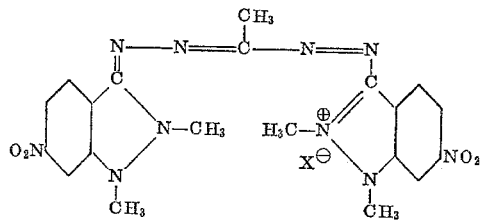

in which X represents a monovalent anion.

3. The quaternary compound of the formula:

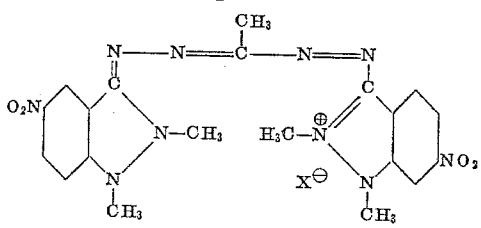

in which X represents a monovalent anion.

4. The quaternary compound of the formula:

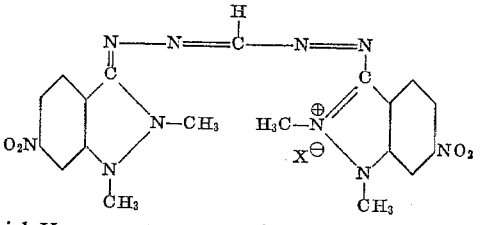

in which X represents a monovalent anion.

References Cited by the Examiner
UNITED STATES PATENTS
2,832,764   4/58   Huenig _____ 260—157 X CHARLES B. PARKER, *Primary Examiner.*
JOSEPH P. BRUST, *Examiner.*